Patented Dec. 21, 1948

2,456,609

UNITED STATES PATENT OFFICE 2,456,609

WELDING ELECTRODES

William Andrews, Gateshead-on-Tyne, England, assignor to Metal and Thermit Corporation, New York, N. Y.

No Drawing. Application January 18, 1946, Serial No. 642,117. In Great Britain February 14, 1944

Section 1, Public Law 690, August 8, 1946
Patent expires February 14, 1964

10 Claims. (Cl. 219—8)

This invention relates to non-ferrous welding electrodes suitable for welding aluminum, copper, nickel or alloys thereof or nickel-chromium stainless steels, and it has for its principal object the provision of an improved process for the manufacture of flux-coated welding rods of the kind described.

It is known to provide aluminum electrodes with a flux coating containing purified mineral cryolite and crystalline salts by dipping the rods in an aqueous paste containing the desired ingredients and thereafter drying the adherent layer of composition. If attempts are made to apply a flux coating of this kind on to an electrode by extrusion, difficulties are experienced in obtaining a sufficiently smooth surface. Moreover in the formulation of such flux coatings it is necessary to include a proportion of a binding ingredient and/or an ingredient adapted to facilitate extrusion, and such ingredients do not usually have any fluxing properties.

According to the present invention in a flux-coated non-ferrous welding rod of the kind described at least part of the flux content is constituted by a mixed fluoride of aluminum and of an alkali metal in colloidal form obtained by the double decomposition of an alkali metal fluoride and an aluminum chloride in the presence of water, the said colloidal mixed fluoride also serving as a binding agent for the flux coating. As the mixed fluoride I prefer to employ a mixed fluoride of aluminum and sodium (cryolite) but I may also employ for example a mixed fluoride of aluminum and lithium.

In producing the mixed fluoride for use in the present invention I prefer to employ commercial aluminum chloride containing from 40 to 50% by weight of water of crystallisation, and to react this with sodium fluoride. The product obtained is in the form of a paste containing the colloidal synthetic cryolite together with sodium chloride which is sometimes useful as a constituent of the flux coating, and I may therefore use the paste together with the addition of other conventional flux coating ingredients and extrude the mixture directly onto the welding rod. For some purposes, however, sodium chloride may be undesirable in the flux coating, and in such event the colloidal cryolite may be separated from the reaction product by dissolving out the sodium chloride in excess of water.

Other flux ingredients which may be employed in the flux coating are for example the chloride or fluorides of the alkali metals or of magnesium. A proportion (not exceeding 25% by weight of the flux coating) of mineral cryolite may also be used in addition to the colloidal cryolite employed in accordance with the invention.

The flux coatings of the present invention are particularly useful for non-ferrous electrodes such for example as those of nickel bronze, aluminum-bronze or the alloy known under the registered trade-mark "Monel."

The flux coatings of the present invention are preferably applied to the welding rods by extrusion (when the mixed fluoride serves the purpose of an extrusion aid), and conveniently at a low pressure for example of the order of 1–5 tons per square inch. The coatings should be dried at a raised temperature for example of the order of 200° C. in order to ensure stability and good welding properties. If desired, the flux coatings of the invention may be applied to the welding rods in the form of a dipping paste although in this case they need to be diluted somewhat with water before use.

The following is a more detailed description of weld rod coatings according to the present invention although it is to be understood that the invention is not limited thereby.

7 parts by weight of commercial aluminum chloride containing from 40–50% by weight of water of crystallisation are mixed with 8 parts of technical sodium fluoride in a rotary mixing machine. After about half-an-hour, a small quantity of the sodium fluoride dissolves in the moisture present and initiates the reaction:

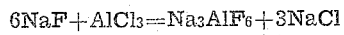

$$6NaF + AlCl_3 = Na_3AlF_6 + 3NaCl$$

The water of crystallisation released from the aluminum chloride gradually converts the whole of the material to a fluid mixture. The heat of the reaction removes some of the moisture and continued stirring gradually converts the mixture to a paste of buttery consistency.

The paste is then checked for acidity with an indicator such as methyl red; if free acid is present it is neutralised by the gradual addition of sodium hydroxide in the form of a 60% solution, allowing 15–30 minutes for gradual neutralisation to take place after each addition. Excessive alkali must be avoided as it would react with the aluminum of the electrodes; and if the paste becomes alkaline it is neutralised by the addition of more aluminum chloride and further mixing. If desired I may start the reaction with a deliberate excess of aluminum chloride, add fuzed calcium chloride to the resulting paste, and finally neutralise the acidity with sodium hydroxide.

The binder paste produced as described above contains approximately:

| | Per cent |
|---|---|
| Cryolite | 30–40 |
| Sodium chloride | 35–45 |
| Water | 15–25 | together with any impurities which may have been present in the original salts.

This paste is then used with the addition of salts in the following mixtures:

| | Per cent |
|---|---|
| Binder paste (prepared as above) | 15–35 |
| Potassium chloride | 25–30 |
| Sodium chloride | 20–25 |
| Mineral cryolite | 0–9 |
| Lithium fluoride | 3–16 |
| Magnesium chloride | 0–6 |

It will be evident that this flux coating contains from 4.5 to 14% by weight of synthetic cryolite.

These mixtures can be extruded as coatings on non-ferrous weld rods at a low pressure without other extrusion aids and should be dried at about 200° C. The weld rods so coated have stability and good welding properties.

I claim:

1. A flux-coated non-ferrous welding electrode for welding non-ferrous metals such as aluminum, copper, nickel, alloys of the foregoing, and nickel-chromium stainless steel, in which the flux coating is made from (1) 15 to 35% by weight of a paste hereinafter described and (2) the balance a mixture of halides of lithium, sodium, potassium, and magnesium, said halides being selected from the class consisting of chlorides and fluorides, said paste comprising 15 to 25% by weight of water, 35 to 45% by weight of sodium chloride, and 30 to 40% by weight of a synthetic colloidal cryolite obtained by the double decomposition of aluminum chloride and a fluoride of an alkali metal selected from the class consisting of sodium and lithium in the presence of water, the amounts of the paste ingredients being based upon the paste, and said flux coating having been dried on the electrode.

2. An electrode as described in claim 1 in which the coating contains 25 to 30% by weight of potassium chloride.

3. An electrode as described in claim 2 in which the coating contains 20 to 25% by weight of sodium chloride.

4. An electrode as described in claim 3 in which the coating contains 3 to 16% by weight of lithium fluoride.

5. An electrode as described in claim 4 in which the coating contains up to 6% by weight of magnesium chloride.

6. A flux-coated non-ferrous welding electrode for welding non-ferrous metals in which the flux coating is made from

| | Per cent |
|---|---|
| (1) Paste, hereinafter described | 15–35 |
| (2) Potassium chloride | 25–30 |
| (3) Sodium chloride | 20–25 |
| (4) Lithium fluoride | 3–16 | all of the foregoing percentages being based on the weight of the coating, said paste comprising 15 to 25% by weight of water, 35 to 45% by weight of sodium chloride, and 30 to 40% by weight of synthetic colloidal cryolite obtained by the double decomposition of sodium fluoride and aluminum chloride in the presence of water, the amounts of the paste ingredients being based upon the paste, and said flux coating having been dried on the electrode.

7. A flux coating composition for a non-ferrous welding electrode comprising (1) 15 to 35% by weight of a paste hereinafter described and (2) the balance a mixture of halides of lithium, sodium, potassium, and magnesium, said halides being selected from the class consisting of chlorides and fluorides, said paste comprising 15 to 25% by weight of water, 35 to 45% by weight of sodium chloride, and 30 to 40% by weight of a synthetic colloidal cryolite obtained by the double decomposition of aluminum chloride and a fluoride of an alkali metal selected from the class consisting of sodium and lithium in the presence of water, the amounts of the paste ingredients being based upon the paste.

8. A flux coating composition for a non-ferrous welding electrode comprising

| | Per cent |
|---|---|
| (1) Paste, hereinafter described | 15–35 |
| (2) Potassium chloride | 25–30 |
| (3) Sodium chloride | 20–25 |
| (4) Lithium fluoride | 3–16 | all of the foregoing percentages being based on the weight of the coating, said paste comprising 15 to 25% by weight of water, 35 to 45% by weight of sodium chloride, and 30 to 40% by weight of colloidal cryolite obtained by the double decomposition of sodium fluoride and aluminum chloride in the presence of water, the amounts of the paste ingredients being based upon the paste.

9. A flux-coated non-ferrous welding electrode for welding aluminum, copper, nickel, alloys thereof, or nickel-chromium stainless steel, in which the flux coating is made from (1) 4.5 to 14% by weight of colloidal cryolite obtained as hereinafter described and (2) the balance of a mixture of halides of lithium, potassium, and magnesium, said halides being selected from the class consisting of chlorides and fluorides, said colloidal cryolite being obtained by the double decomposition of sodium fluoride and aluminum chloride in the presence of water, said flux coating having been dried on the electrode.

10. A flux coating composition for a non-ferrous welding electrode comprising (1) 4.5 to 14% by weight of colloidal cryolite obtained as hereinafter described and (2) the balance a mixture of halides of lithium and potassium, said halides being selected from the class consisting of chlorides and fluorides, said colloidal cryolite being obtained by the double decomposition of aluminum chloride and a fluoride of an alkali metal selected from the class consisting of sodium and lithium in the presence of water.

WILLIAM ANDREWS.

REFERENCES CITED

The following references are of record in the file of this patent:

UNITED STATES PATENTS

| Number | Name | Date |
|---|---|---|
| 1,538,355 | Rossi | May 19, 1925 |
| 1,923,375 | Halt | Aug. 22, 1933 |
| 1,946,958 | Anastasiadis | Feb. 13, 1934 |
| 2,337,714 | Haim et al. | Dec. 28, 1943 |